(12) United States Patent
Ushikubo et al.

(10) Patent No.: US 8,950,774 B2
(45) Date of Patent: Feb. 10, 2015

(54) WHEEL LOADER

(75) Inventors: Nobuo Ushikubo, Komatsu (JP);
Nobumasa Takamatsu, Komatsu (JP);
Yasuhiro Yamane, Komatsu (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/634,001

(22) PCT Filed: May 10, 2012

(86) PCT No.: PCT/JP2012/062001
§ 371 (c)(1),
(2), (4) Date: Oct. 24, 2012

(87) PCT Pub. No.: WO2013/021700
PCT Pub. Date: Feb. 14, 2013

(65) Prior Publication Data
US 2014/0217700 A1    Aug. 7, 2014

(30) Foreign Application Priority Data

Aug. 8, 2011  (JP) ................................ 2011-172810

(51) Int. Cl.
| | | |
|---|---|---|
| *B60D 1/36* | (2006.01) | |
| *E02F 9/08* | (2006.01) | |
| *B60R 3/02* | (2006.01) | |
| *B62D 53/02* | (2006.01) | |
| *E02F 3/34* | (2006.01) | |

(52) U.S. Cl.
CPC .................. *E02F 9/0841* (2013.01); *B60R 3/02* (2013.01); *B62D 53/02* (2013.01); *E02F 3/3411* (2013.01); *E02F 9/0833* (2013.01)
USPC ......... 280/474; 280/415.1; 280/442; 280/445

(58) Field of Classification Search
USPC ....................... 280/415.1, 442, 445, 474, 400
See application file for complete search history.

(56) References Cited

U.S. PATENT DOCUMENTS

| | | | | | |
|---|---|---|---|---|---|
| 3,253,671 | A | * | 5/1966 | Fielding .......................... | 180/235 |
| 3,370,730 | A | * | 2/1968 | Fielding .......................... | 414/715 |
| 3,612,575 | A | * | 10/1971 | Stewart .......................... | 280/474 |
| 3,663,039 | A | * | 5/1972 | Morgan .......................... | 280/408 |
| 3,778,174 | A | * | 12/1973 | Molby .......................... | 403/143 |
| 3,815,939 | A | * | 6/1974 | Pettay .......................... | 280/474 |
| 3,912,300 | A | * | 10/1975 | Bryan, Jr. .......................... | 280/400 |

(Continued)

FOREIGN PATENT DOCUMENTS

| | | |
|---|---|---|
| CN | 2793166 Y | 7/2006 |
| CN | 201232205 Y | 5/2009 |

(Continued)

*Primary Examiner* — Kevin Hurley
*Assistant Examiner* — Michael Stabley
(74) *Attorney, Agent, or Firm* — Drinker Biddle & Reath LLP

(57) ABSTRACT

A frame locking bar is supported pivotably with respect to a rear body. The frame locking bar is constructed to be able to lock an articulated structure by fixing a front body and the rear body to each other to thereby prevent swing thereof. A fixing mechanism is constructed to be able to position this frame locking bar at a prescribed pivoted position in a cantilevered state. At the positioned prescribed pivoted position, when viewed from above, a foot mount is located outside a side surface of a driver's compartment. Thus, a wheel loader capable of locking an articulated mechanism and allowing easy and highly safe services at a high position is obtained.

8 Claims, 9 Drawing Sheets

(56) References Cited

U.S. PATENT DOCUMENTS

| | | | | |
|---|---|---|---|---|
| 4,116,459 A | * | 9/1978 | Kreitzberg | 280/474 |
| 4,215,874 A | * | 8/1980 | Schoelkopf | 280/474 |
| 4,281,848 A | * | 8/1981 | Youngers | 280/494 |
| 4,471,850 A | * | 9/1984 | Rotz | 180/420 |
| 4,545,454 A | * | 10/1985 | Bas | 180/420 |
| 4,603,876 A | * | 8/1986 | Gray | 280/474 |
| 4,936,737 A | * | 6/1990 | Rae et al. | 414/686 |
| 5,180,028 A | * | 1/1993 | Perrenoud, Jr. | 180/235 |
| 2008/0290694 A1 | | 11/2008 | Spellmeyer et al. | |

FOREIGN PATENT DOCUMENTS

| | | |
|---|---|---|
| JP | 61-81279 A | 4/1986 |
| JP | 1-39266 Y2 | 11/1989 |
| JP | 4-16052 | 2/1992 |
| JP | 5-22264 U | 3/1993 |
| JP | 9-220979 A | 8/1997 |
| JP | 2001-278133 A | 10/2001 |
| JP | 2004-68290 A | 3/2004 |
| XN | 6-26450 Y2 | 7/1994 |

* cited by examiner

FIG.6
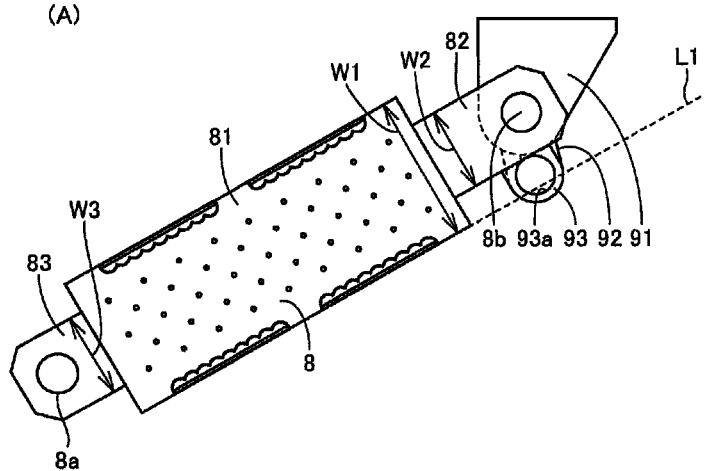
(A)
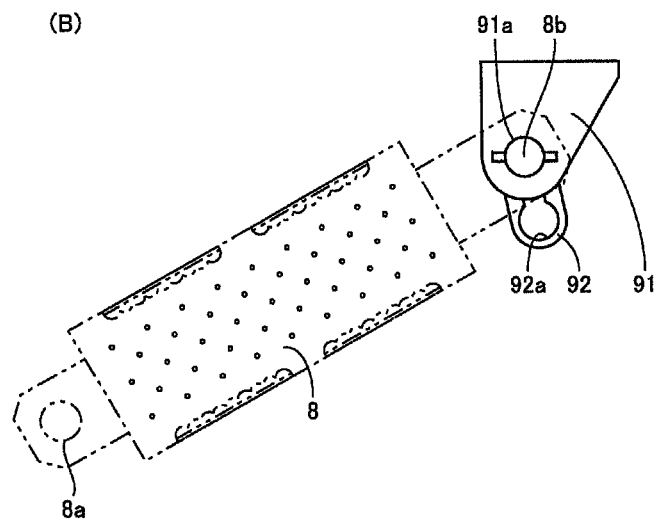
(B)

FIG.7
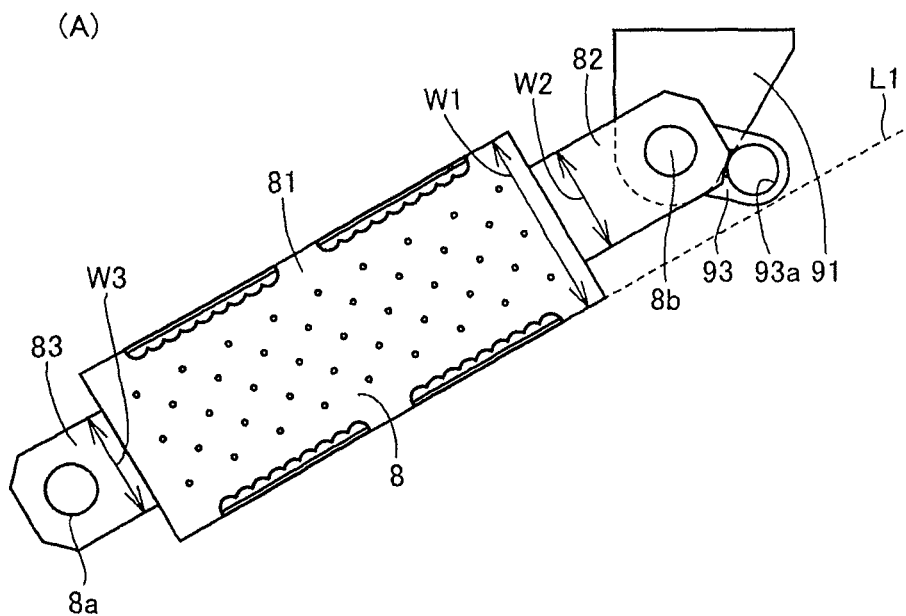
(A)
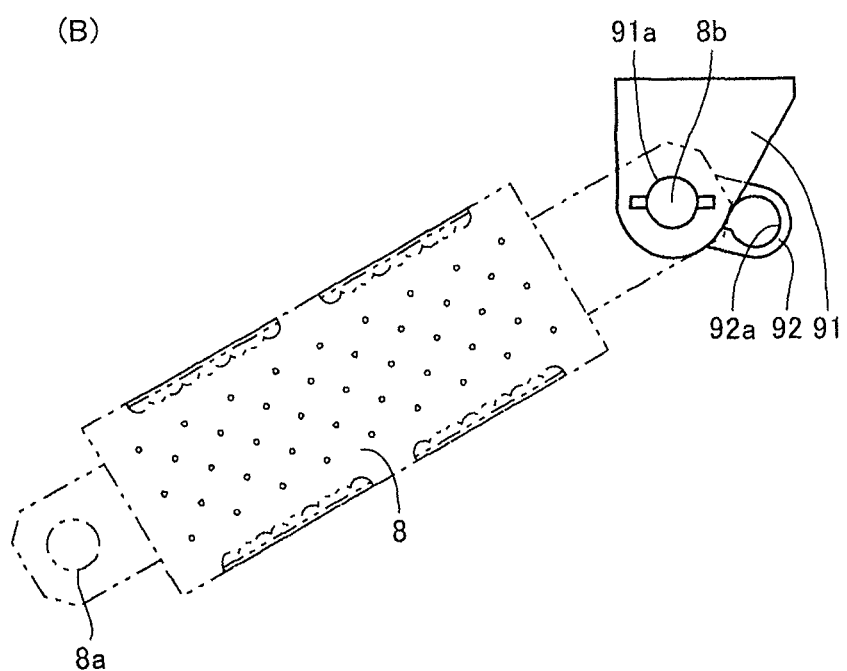
(B)

FIG.10
(A)
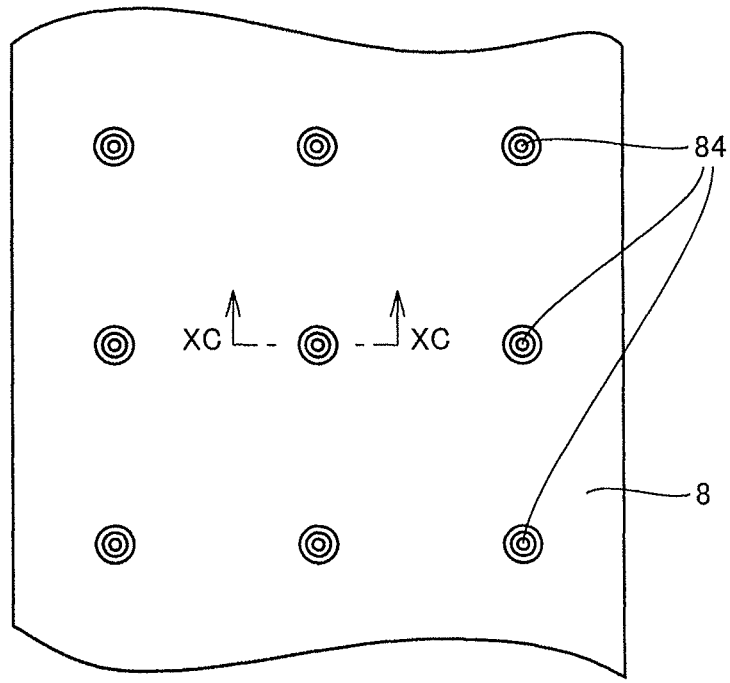
(B)
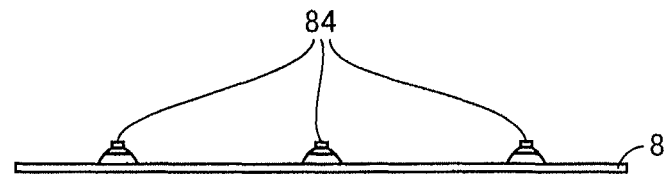
(C)
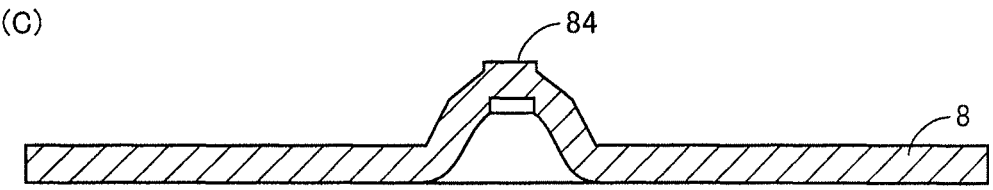

WHEEL LOADER

TECHNICAL FIELD

The present invention relates to a wheel loader, and particularly to a wheel loader having a front body and a rear body coupled to each other such that they can swing to left and right directions.

BACKGROUND ART

In some wheel loaders, a main body is separated into a front body and a rear body and they are coupled to each other such that these front and rear bodies are swung and steered in left and right directions. Such a mechanism is referred to as an articulated mechanism.

By adopting this articulated mechanism, as compared with a wheel loader of which direction of travel is changed by changing an orientation only of wheels through a normal steering operation, advantageously, change in direction can reliably be made with a small slewing radius.

In order to prevent the front body and the rear body from operating during transportation due to such an articulated mechanism, the articulated mechanism should be locked. For example, Japanese Utility Model Publication No. 1-39266 and Japanese Patent Laying-Open No. 61-81279 disclose an apparatus for locking such an articulated mechanism.

CITATION LIST

Patent Literature

PTL 1: Japanese Utility Model Publication No. 1-39266
PTL 2: Japanese Patent Laying-Open No. 61-81279

SUMMARY OF INVENTION

Technical Problem

In providing such services as inspection and cleaning, however, the articulated mechanism does not have to be locked.

In addition, in general, a wheel loader is larger in size than a general vehicle and a vehicle height is also greater. Therefore, in inspecting or cleaning parts (a filter of an air-conditioner, a window pane) on the exterior of a driver's compartment (such as a cab), a serviceperson cannot carry out inspection and cleaning when he/she stands on the ground because the parts are located at such high positions at 2 m or higher above the ground. A stepladder or the like for the serviceperson to go up and down is thus required, however, the serviceperson's substantial efforts are required for installing and removing the stepladder or the like each time such services are provided.

It is also possible that services are provided with a serviceperson riding on an apparatus for locking the articulated mechanism (hereinafter a frame locking bar), however, if services are provided with the frame locking bar being locked, the frame locking bar is located inside a side surface of the cab and a serviceperson's work posture during services is very bad. If service is provided without the frame locking bar being locked, the frame locking bar pivots and it is unstable.

The present invention was made in view of the problems above, and an object thereof is to provide a wheel loader capable of locking an articulated mechanism and allowing easy and highly safe services at a high position.

Solution to Problem

A wheel loader according to the present invention includes a rear body, a cab, a front body, a bracket, a frame locking bar, a first fixing portion, a second fixing portion, and a fixing mechanism. The cab is mounted on the rear body. The front body is coupled to the rear body in a manner swingable to left and right directions. The bracket has a pivot shaft in any one body of the front body and the rear body. The frame locking bar has one end portion pivoting around the pivot shaft and has a foot mount. The first fixing portion is provided in one body having the bracket, for firstly fixing the other end portion of the frame locking bar. The second fixing portion is provided in the other body, for secondarily fixing the other end portion of the frame locking bar. The fixing mechanism serves to fix the frame locking bar at a prescribed pivoted position between the first fixing portion and the second fixing portion. The foot mount of the frame locking bar is located outside a side surface of the cab when viewed from above.

According to the wheel loader of the present invention, by secondarily fixing the frame locking bar pivotably supported on one body to the other body, the rear body and the front body are fixed to each other so that swing can be prevented. Thus, what is called an articulated mechanism can be locked.

In addition, since a serviceperson can provide such services as inspection and cleaning as he/she rides on the frame locking bar at the prescribed pivoted position above, he/she can provide the service at a position high above the ground. Moreover, in providing the service above, a stepladder or the like is not necessary. Therefore, since it is not necessary to install and remove a stepladder or the like each time of service, the serviceperson's efforts can be lessened and the service is facilitated.

Moreover, the frame locking bar can be positioned at a prescribed pivoted position between the first fixing portion and the second fixing portion. Thus, since the frame locking bar can be prevented from pivoting at the pivoted position above during the serviceperson's service, the serviceperson can safely provide the service with his/her foot being mounted on the frame locking bar.

In the wheel loader above, the fixing mechanism has a first through hole provided in the bracket, a second through hole provided in the frame locking bar, and a pin inserted in the first through hole and the second through hole, and a first distance between a center of the first through hole and a center of pivot is equal to a second distance between a center of the second through hole and the center of pivot. Thus, since the frame locking bar is fixed to the bracket with the pin at the prescribed pivoted position above and does not pivot, the serviceperson can safely provide the service with his/her foot being mounted on the frame locking bar.

In the wheel loader above, the fixing mechanism has a plunger provided in the frame locking bar and a plurality of V-shaped grooves provided in the bracket. Thus, since the frame locking bar is fixed to the bracket at the prescribed pivoted position above with the pin and does not pivot, the serviceperson can safely provide the service with his/her foot being mounted on the frame locking bar. In addition, the frame locking bar can be positioned at a plurality of locations.

In the wheel loader above, the frame locking bar has the foot mount greater in width than the one end portion, between the one end portion and the other end portion.

Thus, the serviceperson can mount his/her foot on the frame locking bar in a stable manner.

In the wheel loader above, in the one end portion, a portion having the second through hole is formed so as not to protrude in a direction of width relative to the foot mount. Thus, the serviceperson's foot being caught in the portion having the second through hole is suppressed and hence the serviceperson can more safely provide the service.

In the wheel loader above, the frame locking bar has a non-slip portion on a surface. Thus, in the case where the serviceperson mounts his/her foot on the frame locking bar for service as well, the serviceperson's foot is prevented from slipping on the frame locking bar and therefore the serviceperson can more safely provide the service.

In the wheel loader above, the first through hole and the second through hole are equal to each other in diameter. Thus, wobble is suppressed. In the wheel loader above, preferably, an angle formed between the frame locking bar at the prescribed pivoted position and a side surface of one body is at least 20° and at most 40° when viewed from above.

ADVANTAGEOUS EFFECTS OF INVENTION

As described above, according to the present invention, an articulated mechanism can be locked by a frame locking bar, so that service at a high position high above the ground can be provided and the service is facilitated as a serviceperson provides the service riding on the frame locking bar, and the service can be provided safely as the frame locking bar is positioned at a prescribed pivoted position.

BRIEF DESCRIPTION OF DRAWINGS

FIG. 6 is a diagram (A) showing in an enlarged manner a construction of the frame locking bar in the wheel loader shown in FIGS. 1 and 2 and (B) showing in an enlarged manner a construction of a bracket pivotably supporting the frame locking bar in (A).

FIG. 7 is a diagram (A) showing in an enlarged manner a construction of the frame locking bar arranged such that a member having a through hole 93a formed does not protrude in a direction of width relative to a foot mount 81 of the frame locking bar and (B) showing in an enlarged manner a construction of the bracket pivotably supporting the frame locking bar in (A).

FIG. 10 is a top view (A) and a side view (B) schematically showing such a construction that a protrusion is provided as a non-slip element on a surface of the frame locking bar as well as a cross-sectional view (C) along the line XC-XC in (A).

DESCRIPTION OF EMBODIMENTS

An embodiment of the present invention will be described hereinafter with reference to the drawings.

(First Embodiment)

A construction of a wheel loader in a first embodiment of the present invention will be described initially with reference to FIGS. 1 and 2.

Figure 1:
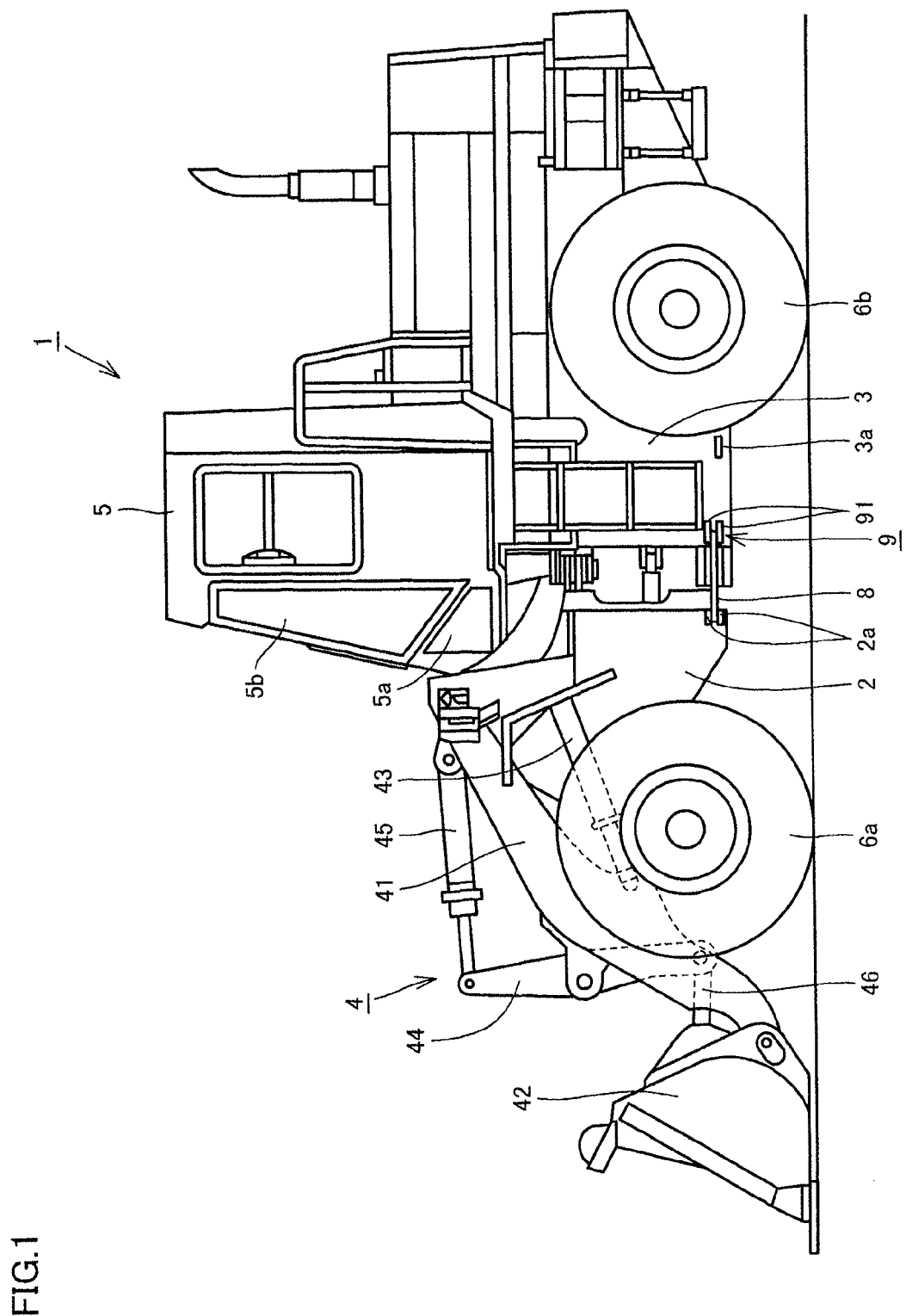
FIG. 1 is a side view schematically showing a construction of a wheel loader in a first embodiment of the present invention.
Figure 2:
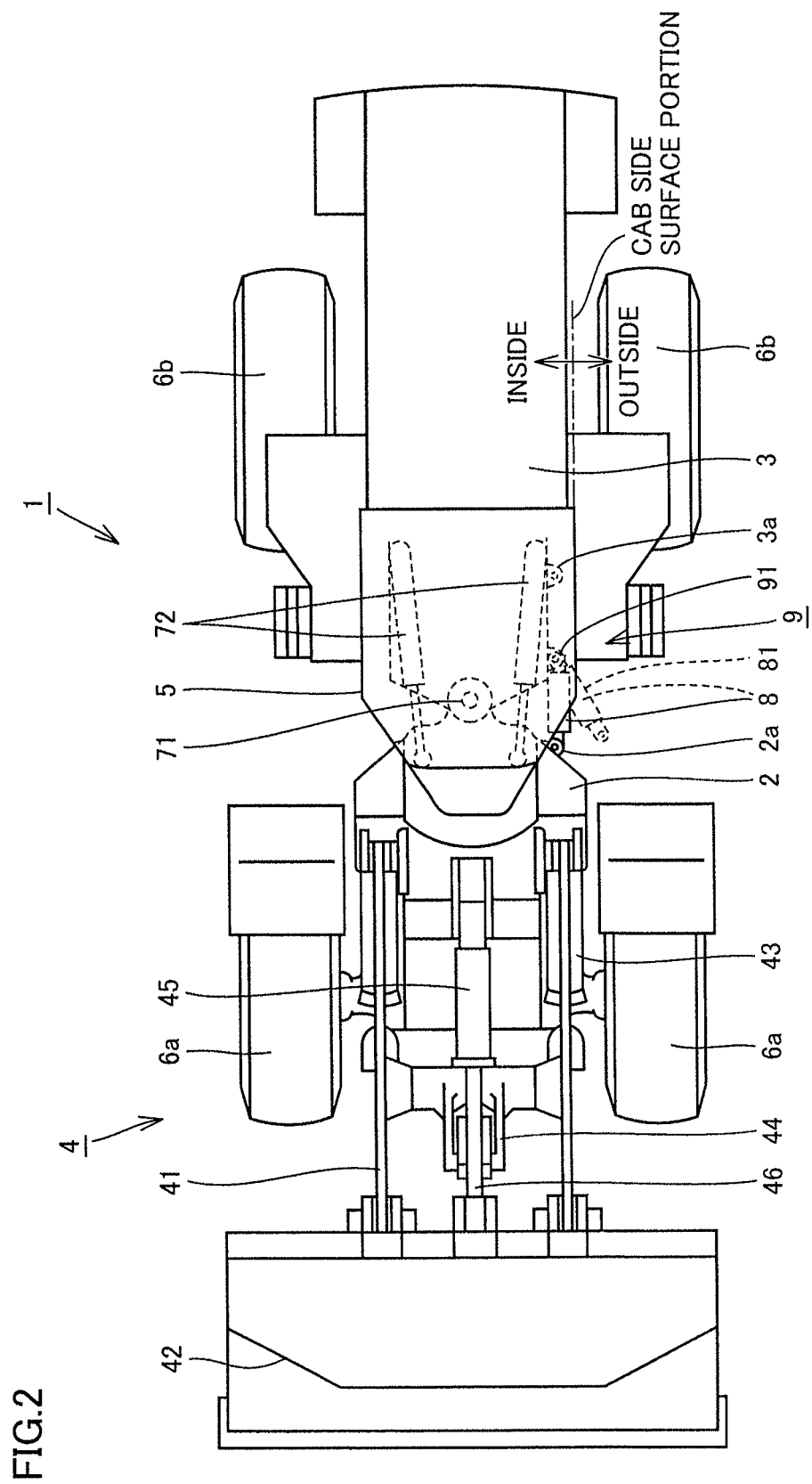
FIG. 2 is a top view schematically showing a construction of the wheel loader in the first embodiment of the present invention.

Referring to FIGS. 1 and 2, a wheel loader 1 in the present embodiment mainly has a front body 2, a rear body 3, an operating machine 4, a frame locking bar 8, and a fixing mechanism 9. A front wheel 6a is attached to each of opposing side portions of front body 2, and a rear wheel 6b is attached to each of opposing side portions of rear body 3.

Front body 2 and rear body 3 are attached in a manner swingable to left and right (left and right when viewed from a driver who seats in a driver's seat) by means of a center pin 71 and they constitute an articulated structure. Namely, front body 2 and rear body 3 are coupled to each other through a pair of left and right steering cylinders 72, 72, and front body 2 and rear body 3 are constructed to swing and steer to left and right around center pin 71, by extending and contracting these left and right steering cylinders 72, 72.

Operating machine 4 is attached in a front portion of front body 2. This operating machine 4 has a boom 41 of which base end portion is swingably attached to front body 2 and a bucket 42 swingably attached to a tip end portion of boom 41. Front body 2 and boom 41 are coupled to each other by a pair of boom cylinders 43, 43 and they are constructed to swing boom 41 by extending and contracting boom cylinders 43, 43.

In addition, operating machine 4 has a tilt arm 44 swingably supported on boom 41 in a substantially central portion thereof, a bucket cylinder 45 coupling a base end portion of tilt arm 44 and front body 2 to each other, and a tilt rod 46 coupling a tip end portion of tilt arm 44 and bucket 42 to each other. Operating machine 4 is constructed such that bucket 42 swings as bucket cylinder 45 extends and contracts.

To an upper front portion of rear body 3, a cab (driver's compartment) 5 is attached. In a side portion of this can 5, for example, an access door 5a for checking an air-conditioner outside-air filter is provided. In addition, in a window on a side surface of cab 5, a window pane 5b is fitted.

Frame locking bar 8 is constructed to be able to lock the articulated structure by fixing front body 2 and rear body 3 to each other to thereby prevent swing. Fixing mechanism 9 is constructed to be able to position this frame locking bar 8 at a prescribed pivoted position in a cantilevered state. At this positioned prescribed pivoted position, as shown in a top view in FIG. 2, a foot mount 81 is located outside a side surface of cab 5. Here, the side surface of cab 5 refers to the side surface of cab 5 in a portion where a door for a driver to enter cab 5 is provided as shown with a chain dotted line in FIG. 2. In addition, outside the side surface of cab 5 refers to a side toward wheels (rear wheel 6b) relative to the side surface of cab 5. A construction of frame locking bar 8 and fixing mechanism 9 will now be described in detail with reference to FIG. 3.

Figure 3:
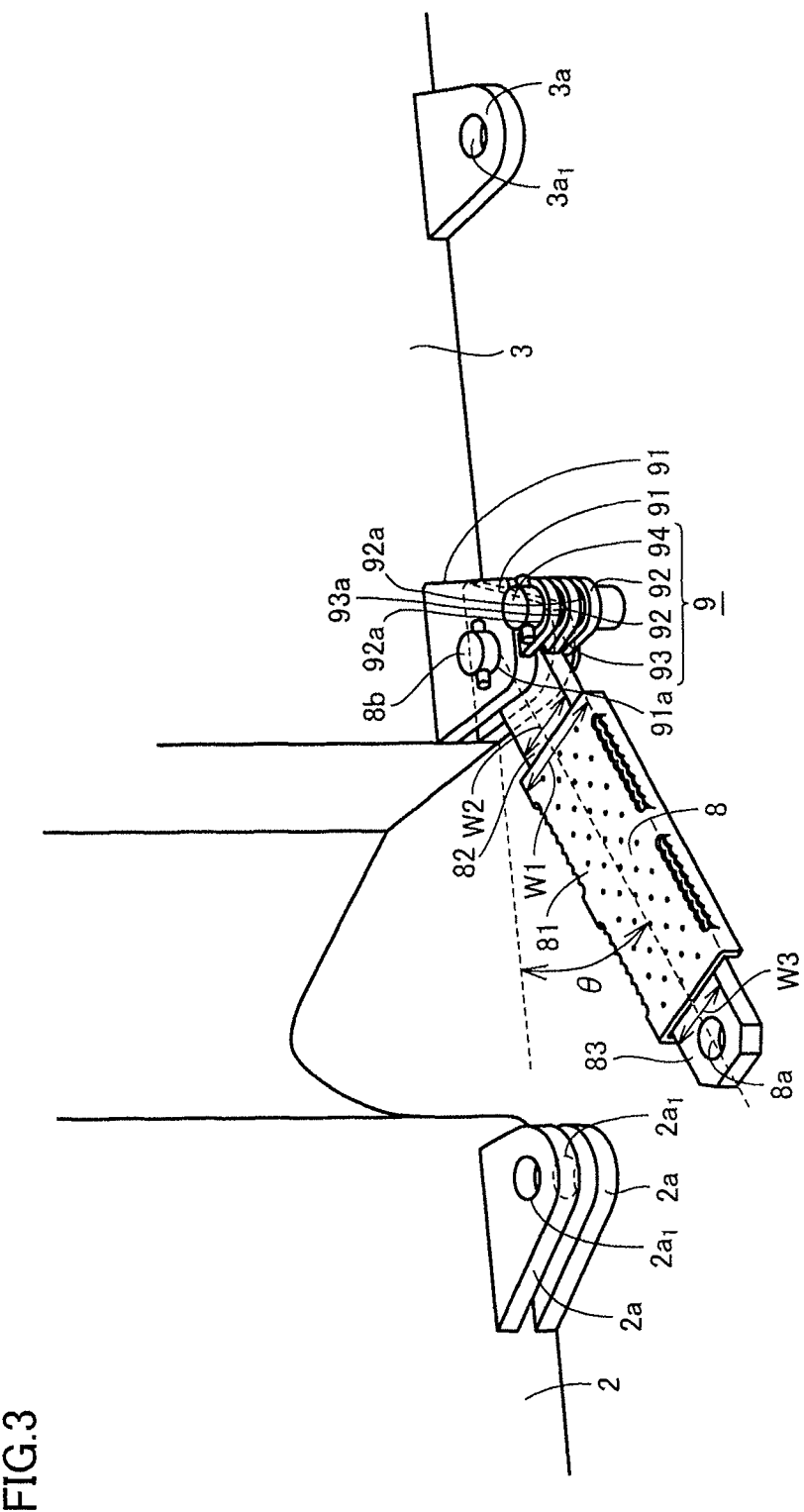
FIG. 3 is a schematic perspective view showing a construction of a frame locking bar and surroundings in the wheel loader shown in FIGS. 1 and 2 and showing such a state that the frame locking bar is at a positioned prescribed pivoted position.

Referring to FIG. 3, frame locking bar 8 has foot mount 81 located in a central portion in a longitudinal direction and one end portion 82 and the other end portion 83 located on opposing sides of foot mount 81, respectively. A width W1 of foot mount 81 is greater than a width W2 of one end portion 82 and a width W3 of the other end portion 83. A through hole (not shown) is provided in one end portion 82, and a through hole 8a is provided in the other end portion 83.

One end portion 82 of frame locking bar 8 is sandwiched between a pair of brackets 91, 91 provided at a lower end of a side portion of rear body 3. Each of this pair of brackets 91, 91 has a through hole 91a, and a pin (pivot shaft) 8b is inserted in these two through holes 91 a and a through hole (not shown) in one end portion of frame locking bar 8. Thus, frame locking bar 8 is supported pivotably with respect to rear body 3, with pin 8b serving as a center of rotation. Namely, frame locking bar 8 is supported on rear body 3 so as to be pivotable in a plane including front, rear, left, and right of wheel loader 1, around an axial line of pin 8b extending in a vertical direction of wheel loader 1.

Fixing mechanism 9 has a portion 92 having a through hole 92a formed, a portion 93 having a through hole 93a formed, and a columnar pin 94. Portion 92 having through hole 92a formed is provided in a side portion of each of the pair of brackets 91, 91. In addition, portion 93 having through hole 93a formed is provided in a side portion of one end portion 82 of frame locking bar 8. Each of through holes 92a, 93a has, for example, a circular shape, and has a dimension (for example, a diameter) allowing insertion of pin 94. Through holes 92a, 93a are equal to each other in diameter. Furthermore, a distance between a center of through hole 93a and a center of pivot (the axial line of pin 8b above) is equal to a distance between a center of through hole 92s and the center of pivot (the axial line of pin 8b above).

When frame locking bar 8 is at the prescribed pivoted position, through hole 92a and through hole 93a are arranged in line. Therefore, at this prescribed pivoted position, the same pin 94 can be inserted in both of through hole 92a and through hole 93a. Thus, frame locking bar 8 can be fixed not to pivot with respect to rear body 3. When this frame locking bar 8 is at the positioned prescribed pivoted position, in a top view, an angle θ formed between frame locking bar 8 at the prescribed pivoted position and the side surface of rear body 3 is preferably at least 20° and at most 40° and more preferably 30°.

In addition, a bracket 3a is provided at a lower end of the side portion of rear body 3. This bracket 3a serves to fix the other end portion 83 of frame locking bar 8 to rear body 3 when frame locking bar 8 is at a stored position which will be described later. A through hole $3a_1$ is formed in this bracket 3a.

Moreover, a pair of brackets 2a, 2a is provided at a lower end of a side portion of front body 2. The pair of brackets 2a, 2a serves to fix the other end portion 83 of frame locking bar 8 to front body 2 when frame locking bar 8 is at a fixed position which will be described later. A through hole $2a_1$ is formed in each of this pair of brackets 2a, 2a.

Each of a stored position, a fixed position, and a positioned prescribed pivoted position of frame locking bar 8 above will now be described with reference to FIGS. 3 to 5.

Figure 4:
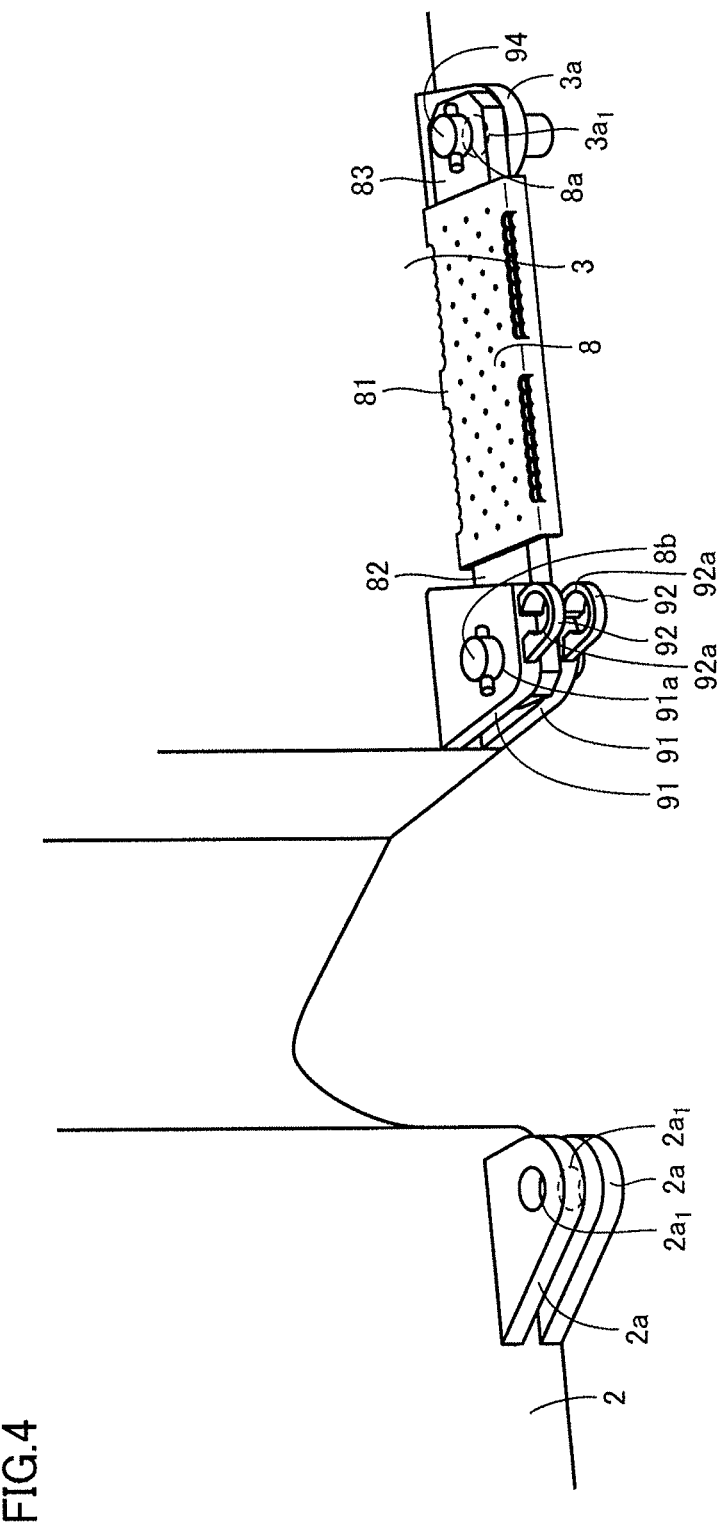
FIG. 4 is a schematic perspective view showing a construction of the frame locking bar and surroundings in the wheel loader shown in FIGS. 1 and 2 and showing such a state that the frame locking bar is at a stored position.

Referring to FIG. 4, when frame locking bar 8 is at the stored position, the other end portion 83 of frame locking bar 8 is fixed to bracket 3a provided in rear body 3.

This fixing is achieved by bringing through hole 8a in the other end portion 83 of frame locking bar 8 and through hole $3a_1$ in bracket 3a in registration and inserting the same pin 94 in both of through holes 8a, $3a_1$.

In a normal operation state of wheel loader 1 such as an excavation operation and a loading operation which will be described later, frame locking bar 8 is at this stored position.

Figure 5:
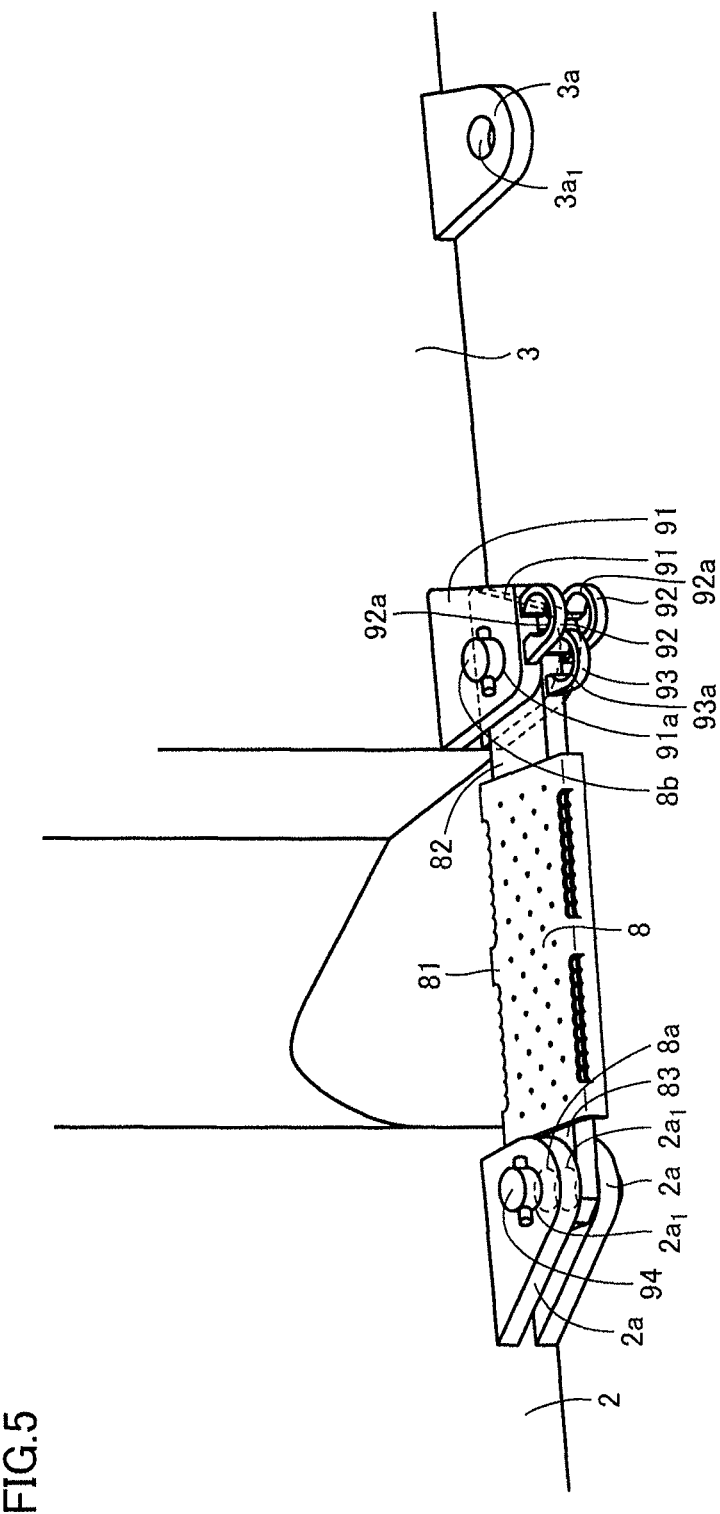
FIG. 5 is a schematic perspective view showing a construction of the frame locking bar and surroundings in the wheel loader shown in FIGS. 1 and 2 and showing such a state that the frame locking bar is at a fixed position.

Referring to FIG. 5, when frame locking bar 8 is at the fixed position, the other end portion 83 of frame locking bar 8 is fixed as it is sandwiched between the pair of brackets 2a provided in front body 2. This fixing is achieved by bringing through hole 8a in the other end portion 83 of frame locking bar 8 and through holes $2a_1$ in the pair of brackets 2a in registration and inserting the same pin 94 in both of through holes 8a, $2a_1$.

In locking the articulated structure of wheel loader 1, frame locking bar 8 is at this fixed position. Namely, when the articulated structure should be locked such as during transportation of a vehicle or during maintenance of the inside of the body with an engine being kept operating, frame locking bar 8 is at this fixed position.

Referring to FIG. 3, frame locking bar 8 is supported on rear body 3 such that it is pivotable between the stored position above (FIG. 4) and the fixed position (FIG. 5). Then, frame locking bar 8 is constructed such that it can be positioned by fixing mechanism 9 at a prescribed pivoted position between the stored position (FIG. 4) and the fixed position (FIG. 5).

At this positioned prescribed pivoted position, as described above, through hole 92a and through hole 93a are aligned. Therefore, at this prescribed pivoted position, the same pin 94 can be inserted in both of through hole 92a and through hole 93a. Thus, frame locking bar 8 can be positioned not to pivot with respect to rear body 3. In this state, the other end portion 83 of frame locking bar 8 has become a free end and frame locking bar 8 is in a cantilevered state.

When a serviceperson does not have to lock the articulated structure (such as when an engine is not operated) and when he/she wishes to inspect, clean, etc. a portion high above the ground and around between front body 2 and rear body 3 (for example, an air-conditioner outside-air filter in access door 5a, window pane 5b of cab 5 in FIG. 1), frame locking bar 8 is set to this prescribed pivoted position. The serviceperson can inspect and clean a high place by riding on this frame locking bar 8.

In addition, by being set at this prescribed pivoted position, frame locking bar 8 can be held slightly away from front body 2 as shown with a dashed line in FIG. 2. Therefore, the serviceperson can inspect, clean, etc. a high place without sticking to front body 2 and rear body 3 and without tilting rearward even when he/she provides the service with his/her foot being mounted on this frame locking bar 8.

Transition between the stored position, the fixed position, and the positioned prescribed pivoted position above can be made by pulling pin 94 out of each through hole. Namely, by pulling pin 94 out of each through hole, fixed frame locking bar 8 is released and is allowed to pivot around pin 8b, so that it can make transition to each state.

Pin 94 used at each of the stored position, the fixed position, and the positioned prescribed pivoted position may be the same. Thus, since pin 94 is used in any state, pin 94 can be prevented from missing.

In addition, in the present embodiment above, as shown in FIG. 6 (A) and (B), portion 93 having through hole 93a, which is provided at one end portion 82 of frame locking bar 8, may be formed to protrude in a direction of width relative to foot mount 81. Namely, portion 93 having through hole 93a may protrude in the direction of width relative to a virtual extension L1 of a side portion of foot mount 81.

In this case, however, the serviceperson may have his/her foot caught in portion 93 having through hole 93a. Therefore, as shown in FIG. 7 (A) and (B), portion 93 having through hole 93a is preferably formed not to protrude in the direction of width relative to foot mount 81. Namely, portion 93 having through hole 93a preferably does not protrude in the direction of width relative to virtual extension L1 of the side portion of foot mount 81. Thus, the serviceperson can be less likely to have his/her foot caught in portion 93 having through hole 93a.

Wheel loader 1 in the present embodiment is generally used for an excavation operation and a loading operation. In performing the excavation operation, wheel loader 1 moves forward while it lowers boom 41 shown in FIGS. 1 and 2 and directs bucket 42 toward the front, and then an end of bucket 42 sticks into a target object. Here, by tilting back bucket 42 by operating bucket cylinder 45, the target object can be scooped in bucket 42.

In performing the loading operation, boom cylinder 43 is extended while the target object is scooped in bucket 42 and boom 41 is raised, and wheel loader 1 moves rearward with bucket 42 being raised. Thereafter, wheel loader 1 is moved forward to a dump truck and bucket cylinder 45 is operated at a prescribed position, so that bucket 42 is dumped to load the target object on a truck box of the dump truck.

A function and effect of the present embodiment will now be described.

According to wheel loader 1 in the present embodiment, frame locking bar 8 pivotably supported on rear body 3 is attached to front body 2, so that rear body 3 and front body 2 are fixed to each other and swing can be prevented. Thus, what is called an articulated mechanism can be locked.

In addition, since a serviceperson can provide such services as inspection and cleaning riding on frame locking bar 8 at the prescribed pivoted position above, the service at a position high above the ground can be provided. Then, in providing the service above, a stepladder or the like is not necessary. Therefore, since it is not necessary to install and remove a stepladder or the like each time of service, the serviceperson's efforts can be lessened and the service is facilitated.

Moreover, frame locking bar 8 can be positioned at a prescribed pivoted position (FIG. 3) between the stored position (FIG. 4) and the fixed position (FIG. 5). Thus, since frame locking bar 8 is positioned at the pivoted position above and does not pivot, the serviceperson can safely provide services on frame locking bar 8.

Furthermore, even when frame locking bar 8 is at the fixed position as shown in FIG. 5, the serviceperson can provide such services as inspection and cleaning at a high place, riding on this frame locking bar 8. At this fixed position, however, as shown with a solid line in FIG. 2, frame locking bar 8 is proximate to both of front body 2 and rear body 3. Therefore, when the serviceperson rides on frame locking bar 8 at this fixed position, the serviceperson will provide services as he/she sticks to front body 2 and rear body 3 or tilts rearward. Then, operability is poor and safety becomes an issue.

In contrast, in the present embodiment, by setting frame locking bar 8 at the prescribed pivoted position above, frame locking bar 8 can be held in a cantilevered state, away from front body 2 as shown with the dashed line in FIG. 2 (a state where foot mount 81 is located outside the side surface of cab 5 in the top view shown in FIG. 2). Therefore, even when the serviceperson provides service with his/her foot being mounted on this frame locking bar 8, he/she can inspect, clean, etc. a high place without sticking to front body 2 and rear body 3 and without tilting rearward. Therefore, operability is good and safety also improves.

Moreover, as shown in FIG. 7, portion 93 having through hole 93a does not protrude in the direction of width relative to foot mount 81, so that the serviceperson's foot being caught in that portion 93 is suppressed and the serviceperson can more safely provide services.

Furthermore, by providing frame locking bar 8 with a non-slip portion on a surface, the serviceperson's foot can be prevented from slipping on frame locking bar 8 even when the serviceperson mounts his/her foot on frame locking bar 8 for services, and thus the serviceperson can safely provide services. This non-slip portion should only be formed at least on foot mount 81 of frame locking bar 8, and it may be provided on a surface of one end portion 82 and the other end portion 83, other than foot mount 81.

Though such a construction that frame locking bar 8 is supported pivotably with respect to rear body 3 has been described in the present embodiment above, frame locking bar 8 may be constructed to fix rear body 3 and front body 2 to each other so as to prevent swing by pivotably supporting the one end portion on front body 2 and attaching the other end portion to rear body 3.

In addition, though a case where one through hole 93a is formed in the side portion of frame locking bar 8 has been described in the present embodiment above, a plurality of through holes 93a may be formed in the side portion of frame locking bar 8. Thus, frame locking bar 8 can be positioned at a plurality of pivoted positions.

(Second Embodiment)

Though a case where fixing mechanism 9 has such a construction that pin 94 is inserted in through holes 92a, 93a has been described in the first embodiment above, fixing mechanism 9 may be constructed in any manner so long as it is constructed to be able to position frame locking bar 8 at a prescribed pivoted position.

Figure 8:
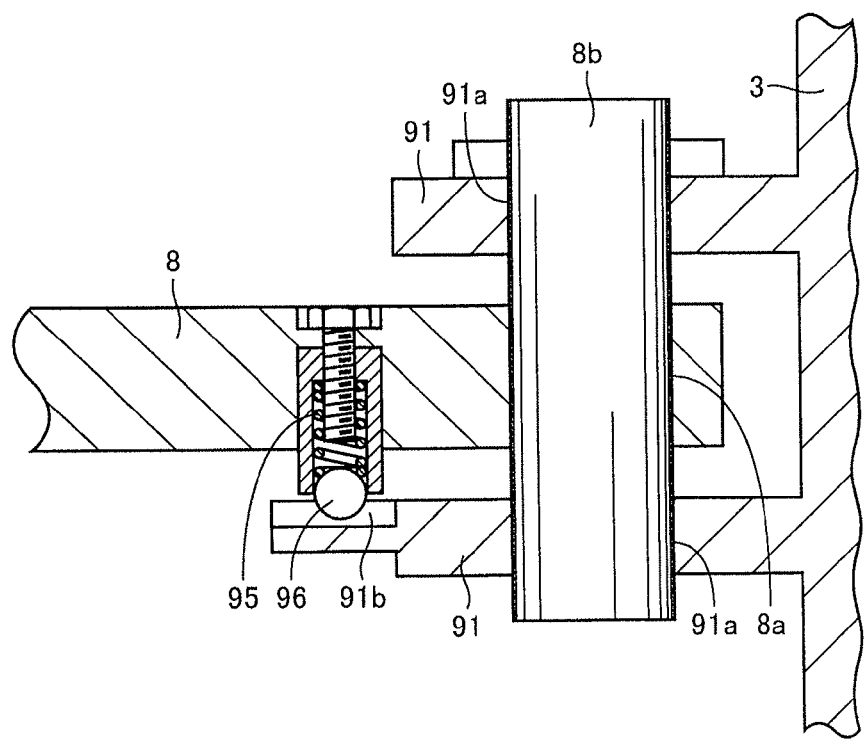
FIG. 8 is a schematic cross-sectional view showing another example of a fixing mechanism for positioning the frame locking bar at a prescribed pivoted position.

As shown in FIG. 8, this fixing mechanism 9 may be constructed, for example, to have a plunger and a V-shaped groove. The plunger in the present embodiment is constituted of a spring 95 and a rigid ball 96. Namely, fixing mechanism 9 may be constructed to achieve positioning as spring 95 presses rigid ball 96 against a V-shaped groove 91b. In this construction, a hole is provided in frame locking bar 8, and spring 95 is arranged in that hole. This spring 95 presses rigid ball 96 against a surface of a bracket 91. Meanwhile, V-shaped groove 91b is provided in the surface of bracket 91.

Then, by pivoting frame locking bar 8, rigid ball 96 pressed against by spring 95 fits into that V-shaped groove 91b when spring 95 comes directly above V-shaped groove 91b, and thus frame locking bar 8 is positioned.

Figure 9:
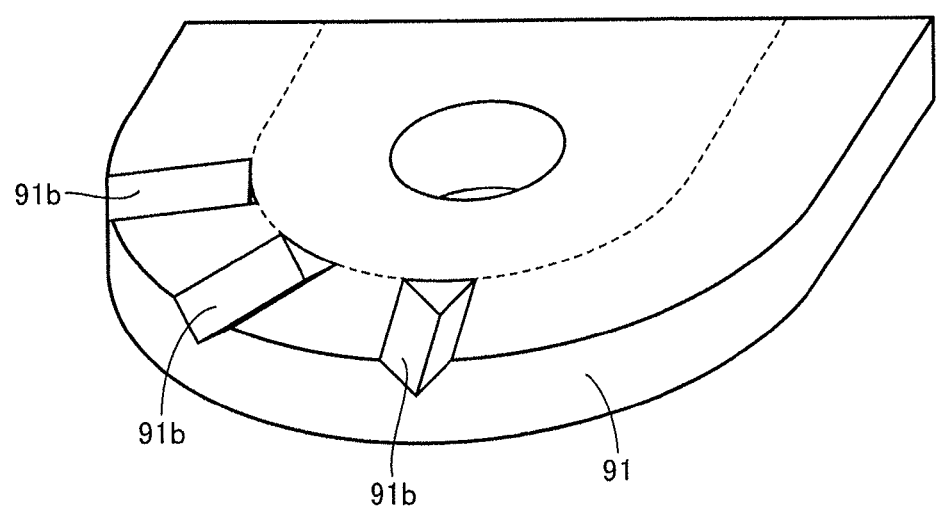
FIG. 9 is a schematic perspective view showing a construction of a wheel loader in a second embodiment of the present invention and a construction of a bracket used in the fixing mechanism shown in FIG. 8.

It is noted that a plurality of V-shaped grooves 91b may be provided in the surface of bracket 91 as shown in FIG. 9. Thus, frame locking bar 8 can be positioned at a plurality of pivoted positions. Instead of the rigid ball, a rod may be employed.

Others

In any of the first and second embodiments above, frame locking bar 8 preferably has a non-slip portion on the surface. Sandpaper, a plurality of protrusions 84 (see FIG. 10 (A), (B), (C)), a plurality of holes, or any combination thereof, and the like are possible as this non-slip portion.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

Industrial Applicability

The present invention is advantageously applicable to a wheel loader having a front body and a rear body coupled to each other in a manner swingable in left and right directions.

REFERENCE SIGNS LIST

1 wheel loader; 2*a* bracket; 2 front body; 2*a*$_1$, 3*a*$_1$, 91*a*, 92*a*, 93*a* through hole; 3*a* bracket; 3 rear body; 4 operating machine; 5*a* access door; 5*b* window pane; 5 cab; 6*a* front wheel; 6*b* rear wheel; 8*b*, 94 pin; 8 frame locking bar; 8*a* through hole; 9 fixing mechanism; 41 boom; 42 bucket; 43 boom cylinder; 44 tilt arm; 45 bucket cylinder; 46 tilt rod; 71 center pin; 72 steering cylinder; 81 foot mount; 82 one end portion; 83 the other end portion; 84 protrusion; 91 bracket; 91*b* V-shaped groove; 92 portion having through hole 92*a*; 93 portion having through hole 93*a*; 95 spring; and 96 rigid ball.

The invention claimed is:

1. A wheel loader, comprising:
   a rear body;
   a cab mounted on said rear body;
   a front body coupled to said rear body in a manner swingable to left and right directions;
   a bracket having a pivot shaft in any one body of said front body and said rear body;
   a frame locking bar having one end portion pivoting around said pivot shaft and having a foot mount, for preventing swing by fixing said front body and said rear body to each other;
   a first fixing portion provided in said one body having said bracket, for firstly fixing the other end portion of said frame locking bar;
   a second fixing portion provided in the other body, for secondarily fixing said the other end portion of said frame locking bar; and
   a fixing mechanism for fixing said frame locking bar at a prescribed pivoted position between said first fixing portion and said second fixing portion, the prescribed pivoted position being different than a position where the other end portion of said frame locking bar is fixed to the first fixing portion or the second fixing portion;
   said foot mount of said frame locking bar being located outside a side surface of said cab when viewed from above.

2. The wheel loader according to claim 1, wherein said fixing mechanism has
   a first through hole provided in said bracket,
   a second through hole provided in said frame locking bar, and
   a pin inserted in said first through hole and said second through hole, and
   a first distance between a center of said first through hole and a center of pivot is equal to a second distance between a center of said second through hole and the center of pivot.

3. The wheel loader according to claim 1, wherein said fixing mechanism has
   a plunger provided in said frame locking bar, and
   a plurality of V-shaped grooves provided in said bracket.

4. The wheel loader according to claim 1, wherein
   said frame locking bar has said foot mount greater in width than said one end portion, between said one end portion and said the other end portion.

5. The wheel loader according to claim 2, wherein
   in said one end portion, a portion having said second through hole is formed so as not to protrude in a direction of width relative to said foot mount.

6. The wheel loader according to claim 1, wherein said frame locking bar has a non-slip portion on a surface.

7. The wheel loader according to claim 2, wherein said first through hole and said second through hole are equal to each other in diameter.

8. The wheel loader according to claim 1, wherein an angle formed between said frame locking bar at said prescribed pivoted position and a side surface of said one body is at least 20° and at most 40° when viewed from above.

* * * * *